(12) United States Patent
Fukushima

(10) Patent No.: US 8,711,106 B2
(45) Date of Patent: Apr. 29, 2014

(54) INPUT SYSTEM INCLUDING POSITION-DETECTING DEVICE

(75) Inventor: Yasuyuki Fukushima, Saitama-Ken (JP)

(73) Assignee: Wacom Co., Ltd., Saitama-Ken (JP)

( * ) Notice: Subject to any disclaimer, the term of this patent is extended or adjusted under 35 U.S.C. 154(b) by 248 days.

(21) Appl. No.: 12/419,373

(22) Filed: Apr. 7, 2009

(65) Prior Publication Data
US 2009/0244005 A1    Oct. 1, 2009

Related U.S. Application Data

(62) Division of application No. 11/189,033, filed on Jul. 26, 2005, now abandoned.

(30) Foreign Application Priority Data

Jul. 27, 2004  (JP) .................................. 2004-218374

(51) Int. Cl.
*G06F 3/041* (2006.01)
(52) U.S. Cl.
USPC ...................... 345/173; 178/18.01; 178/18.03; 178/19.01; 178/20.01; 715/863
(58) Field of Classification Search
USPC .................... 345/173–178; 178/18.01–18.11, 178/19.01–19.07, 20.01–20.04; 715/863
See application file for complete search history.

(56) References Cited

U.S. PATENT DOCUMENTS

| | | | |
|---|---|---|---|
| 4,560,830 A | 12/1985 | Perl | |
| 4,686,332 A | 8/1987 | Greanias et al. | |
| 4,806,708 A | 2/1989 | Yahagi | |
| 4,902,858 A | 2/1990 | Yamanami et al. | |
| 5,028,745 A | 7/1991 | Yamanami et al. | |
| 5,120,907 A | 6/1992 | Shinbori et al. | |
| 5,136,125 A | 8/1992 | Russell | |
| 5,210,380 A | 5/1993 | McDermott et al. | |
| 5,345,044 A | 9/1994 | Landmeier | |
| 5,386,219 A | 1/1995 | Greanias et al. | |
| 5,466,896 A * | 11/1995 | Murakami et al. | 178/18.07 |
| 5,854,449 A | 12/1998 | Adkins | |
| 5,945,980 A | 8/1999 | Moissev et al. | |

(Continued)

FOREIGN PATENT DOCUMENTS

| | | |
|---|---|---|
| EP | 0250931 A2 | 1/1988 |
| JP | 04-060715 | 2/1992 |
| WO | 98/00775 A1 | 1/1998 |
| WO | 99/28811 A1 | 6/1999 |

OTHER PUBLICATIONS

Ludlow, "Palm Tunfsten E: A feature-packed budget handheld", Personal Computer World, Nov. 20, 2003 (www.pcw.co.uk/personal-computer-world/hardware/2044666/palm-tungsten).

(Continued)

*Primary Examiner* — Gene W Lee
(74) *Attorney, Agent, or Firm* — Berenato & White, LLC

(57) ABSTRACT

A position-detecting device detects a position pointed to by a position-pointing instrument and includes an operation panel detecting the position pointed to by the position-pointing instrument; and a manipulation-detecting unit located at at least one of the interior and the exterior of the operation panel, and detecting a manipulation by a second instrument other than the position-pointing instrument, or detecting a manipulation by both the position-pointing instrument and the second instrument.

6 Claims, 6 Drawing Sheets

(56) References Cited

U.S. PATENT DOCUMENTS

| | | |
|---|---|---|
| 5,995,084 A | 11/1999 | Chan et al. |
| 6,005,555 A | 12/1999 | Katsurahira et al. |
| 6,094,504 A | 7/2000 | Wu et al. |
| 6,239,790 B1 * | 5/2001 | Martinelli et al. ............ 345/174 |
| 6,255,604 B1 | 7/2001 | Tokioka et al. |
| 6,396,005 B2 | 5/2002 | Rodgers et al. |
| 6,417,846 B1 * | 7/2002 | Lee ............................... 345/173 |
| 6,787,715 B2 | 9/2004 | Chao et al. |
| 7,030,860 B1 | 4/2006 | Hsu et al. |
| 7,190,348 B2 | 3/2007 | Kennedy et al. |
| 7,499,040 B2 | 3/2009 | Zadesky et al. |
| 7,649,562 B2 | 1/2010 | Misawa et al. |
| 7,710,407 B2 | 5/2010 | Trent, Jr. et al. |
| 7,812,268 B2 | 10/2010 | Ely |
| 2002/0015024 A1 * | 2/2002 | Westerman et al. .......... 345/173 |
| 2002/0023265 A1 | 2/2002 | Metcalf |
| 2002/0044201 A1 | 4/2002 | Alexander et al. |
| 2002/0080123 A1 * | 6/2002 | Kennedy et al. .............. 345/173 |
| 2002/0176016 A1 * | 11/2002 | Misawa et al. ........... 348/333.01 |
| 2003/0063073 A1 | 4/2003 | Geaghan et al. |
| 2003/0067447 A1 | 4/2003 | Geaghan et al. |
| 2003/0085882 A1 * | 5/2003 | Lu ................................. 345/173 |
| 2003/0098858 A1 | 5/2003 | Perski et al. |
| 2004/0001048 A1 | 1/2004 | Kraus et al. |
| 2004/0150629 A1 * | 8/2004 | Lee ............................... 345/173 |
| 2004/0174399 A1 | 9/2004 | Wu et al. |
| 2004/0223089 A1 | 11/2004 | Hong et al. |
| 2004/0252109 A1 | 12/2004 | Trent, Jr. et al. |
| 2005/0052425 A1 * | 3/2005 | Zadesky et al. ............... 345/173 |
| 2005/0130738 A1 | 6/2005 | Miyamoto et al. |
| 2006/0012581 A1 | 1/2006 | Haim |

OTHER PUBLICATIONS

The Handbook for the Palm Tungsten E Handheld (http://www.palm.com/us/support/handbooks/tungstene/TungstenE_HB-ENG.pdf).

* cited by examiner

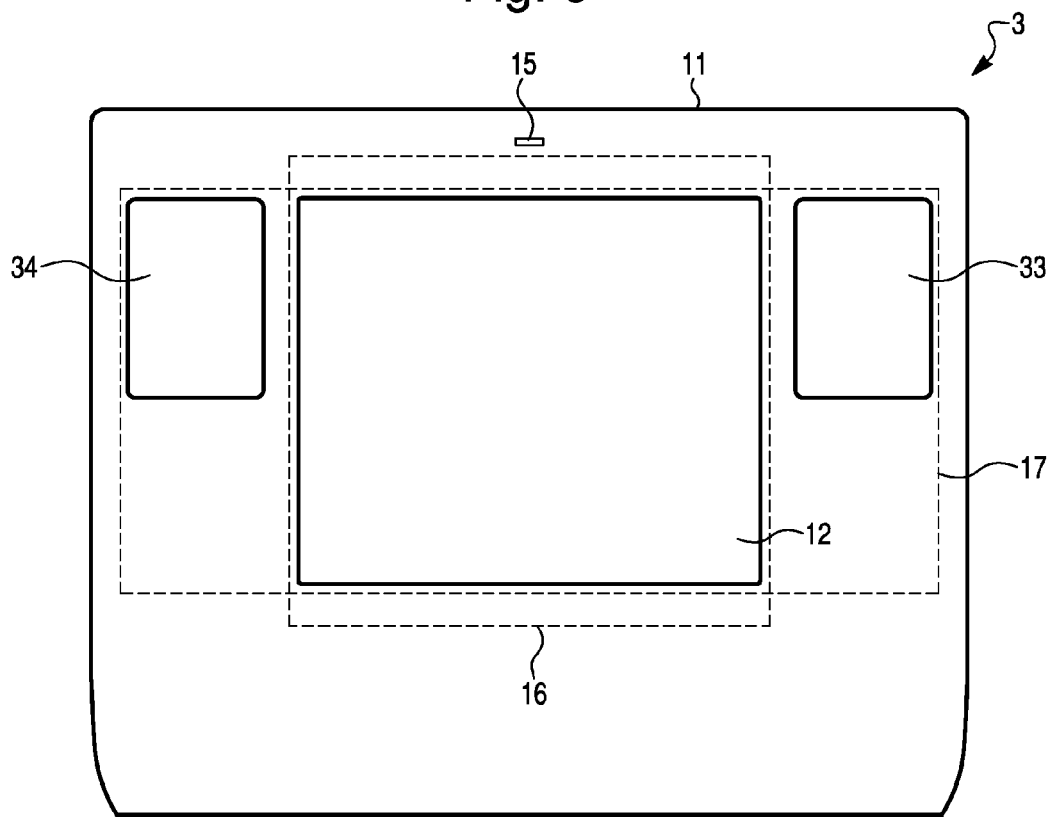

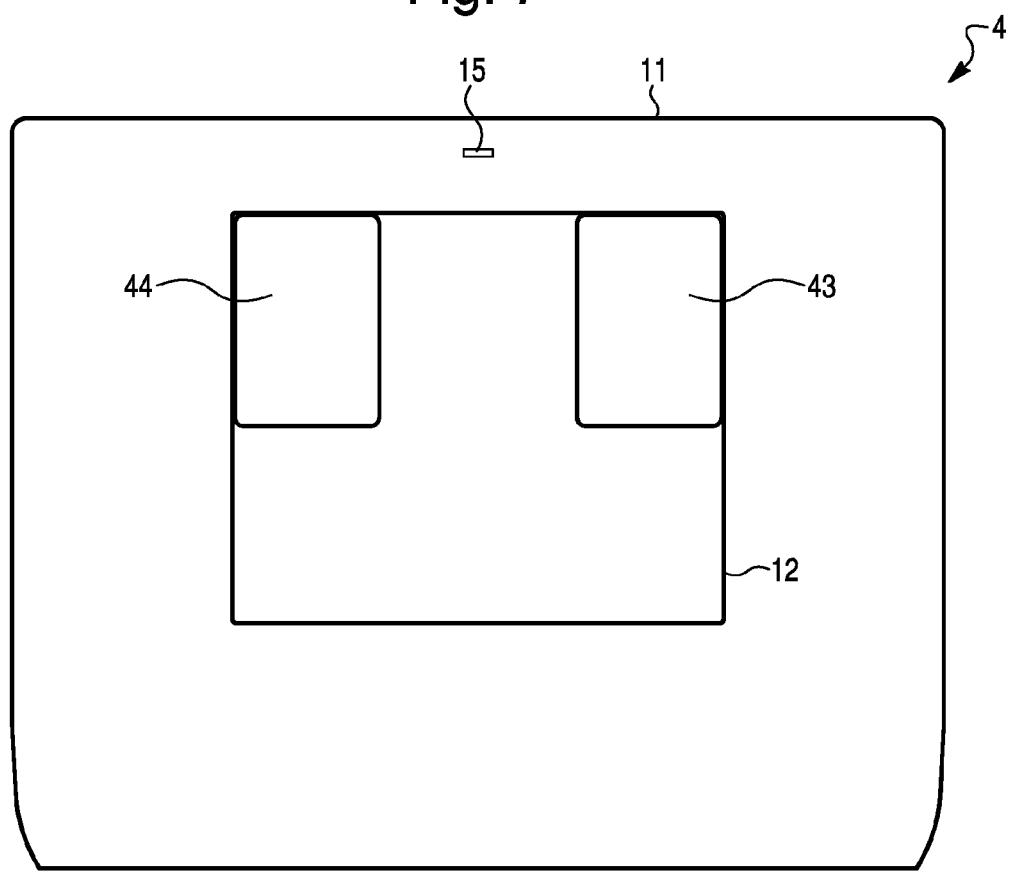

INPUT SYSTEM INCLUDING POSITION-DETECTING DEVICE

CROSS-REFERENCE TO RELATED APPLICATIONS AND CLAIM TO PRIORITY

This application is a divisional of application Ser. No. 11/189,033, filed Jul. 26, 2005 now abandoned, which is based upon application number 2004-218374, filed Jul. 27, 2004 in Japan, the disclosure of which is incorporated herein by reference and to which priority is claimed.

FIELD OF THE INVENTION

The present invention relates to input systems including position-detecting devices that detect positions specified with position-pointing styluses.

BACKGROUND OF THE INVENTION

Pen tablets are known as input devices used in electronic devices, such as personal computers. Japanese Unexamined Patent Application Publication No. 2002-244806 assigned to the present assignee discloses various types of pen tablets.

A typical pen tablet includes a position-pointing stylus and an approximately planar position-detecting device. When a user points at any position on the position-detecting device with the position-pointing stylus in his or her hand, the position-detecting device detects the pointed to position and outputs it to an external electronic device that is connected to the position-detecting device.

Since the user can manipulate the position-pointing stylus as if the user were writing characters or drawing pictures with a pen during an input operation of the electronic device, the user can experience a natural-feeling operation. Thus, pen tablets are popular with users.

For example, when the user inputs drawing positions (hereinafter, this operation is referred to as a drawing operation) when executing a drawing application program in the electronic device, the user can conveniently perform the drawing operation with the pen tablet as if the user were drawing a picture.

When the user executes the drawing application program, the user needs to perform accompanying setting operations in addition to the drawing operation itself. These setting operations include, for example, setting drawing colors, the size of a drawing area, and line thicknesses, scrolling a screen, and zooming in and out.

In general, the user uses a dedicated menu screen to perform these setting operations. In many cases, the user alternately performs the setting operations on the menu screen and the drawing operation. In this environment, since the user needs to suspend the drawing operation and move the position-pointing stylus from a position on a picture being drawn to a position on the menu screen to perform the setting operations on the menu screen during the drawing operation, the continuity of user's thought may be broken, thereby spoiling the user's imagination. The user, who needs to concentrate on the drawing operation, may feel that the operation on the menu screen is highly complicated.

SUMMARY OF THE INVENTION

Accordingly, it is an object of the present invention to facilitate operations, such as setting drawing colors, the size of a drawing area, and line thicknesses, scrolling a screen, and zooming in and out, during the operation of a position-pointing stylus.

To achieve the object, a position-detecting device according to the present invention detects a position pointed to by a position-pointing instrument. The position-detecting device includes an operation panel detecting the position pointed to by the position-pointing instrument; and a manipulation-detecting unit located at at least one of the interior and the exterior of the operation panel, and detecting a manipulation by a second instrument other than the position-pointing instrument, or detecting a manipulation by both the position-pointing instrument and the second instrument. In this case, the second instrument is, for example, a user's finger.

Thus, since a user can simultaneously perform a certain type of operation using the position-pointing instrument and another type of operation on the manipulation-detecting unit, the user can perform various types of operations without suspending the manipulation by the position-pointing instrument, thereby achieving excellent operability. For example, the user can simultaneously perform an operation using the position-pointing instrument in the right hand and manipulate the manipulation-detecting unit using the left hand. The user can also manipulate the manipulation-detecting unit using the position-pointing instrument in the right hand. That is, the user can use both hands to perform an input operation. Moreover, when the manipulation-detecting unit detects a manipulation by the position-pointing instrument, the user can manipulate the manipulation-detecting unit, holding the position-pointing instrument in his or her hand, and can perform various types of operations only with the position-pointing instrument.

The position on the operation panel pointed to by the position-pointing instrument may be detected by sending and receiving electromagnetic waves to and from the position-pointing instrument.

In this arrangement, the manipulation-detecting unit may be a push-detecting switch.

The manipulation-detecting unit may detect a touching or pushing manipulation.

In this arrangement, the user can manipulate the manipulation-detecting unit by a simple manipulation, that is, a touching or pushing manipulation. Thus, even when the user performs an operation using the position-pointing instrument in the dominant hand and manipulates the manipulation-detecting unit using the nondominant hand, the user can reliably perform the operation, thereby achieving excellent operability and reducing the user's workload.

The manipulation-detecting unit may detect the manipulation by both the position-pointing instrument and the second instrument, and the position-detecting device may determine whether the manipulation is performed by the position-pointing instrument or the second instrument, upon detecting the manipulation through the manipulation-detecting unit.

In this arrangement, the user can perform various types of input operations using the manipulation-detecting unit by distinguishing a manipulation by the position-pointing instrument from that by the second instrument.

The operation panel and an area peripheral to the operation panel may form a detectable area detecting the position of the position-pointing instrument, the manipulation-detecting unit may be disposed within the detectable area, and the position-detecting device may determine whether the manipulation detected by the manipulation-detecting unit is performed by the position-pointing instrument or the second instrument, based on the position of the position-pointing instrument during the manipulation.

In this arrangement, the position-detecting device can reliably determine the type of instrument used for manipulating the manipulation-detecting unit. Moreover, since the detectable area need not correspond to the operation panel, flexibility in the location of the manipulation-detecting unit can be improved.

The manipulation-detecting unit may be disposed within the operation panel. In this arrangement, the size of the position-detecting device can be reduced.

The position-detecting device according to the present invention includes a position-pointing instrument, and an electronic device operating based on the detected position from the position-detecting device which may constitute an input system.

In this arrangement, the user can simultaneously perform an input operation of the electronic device using the position-pointing instrument and another input operation. For example, when a drawing application program is executed in the electronic device, the user can simultaneously draw lines using the position-pointing instrument and can manipulate the manipulation-detecting unit to invoke a menu screen and perform operations on the menu screen and other operations, such as scrolling the screen and zooming in and out. Thus, the user can perform operations other than an application operation so that the application operation flow using the position-pointing instrument and the user's thoughts are not interrupted, thereby achieving excellent operability. Moreover, for example, the user can simultaneously perform an operation using the position-pointing instrument in the right hand and manipulate the manipulation-detecting unit using the left hand. The user can also manipulate the manipulation-detecting unit using the position-pointing instrument in the right hand. That is, the user can use both hands to perform an input operation of the electronic device.

BRIEF DESCRIPTION OF THE DRAWINGS

FIG. 6 is a plan view illustrating the overall structure of a tablet according to a second embodiment of the present invention; and FIG. 7 is a plan view illustrating the overall structure of a tablet according to a third embodiment of the present invention.

DETAILED DESCRIPTION OF THE PREFERRED EMBODIMENT(S)

Figure 1:
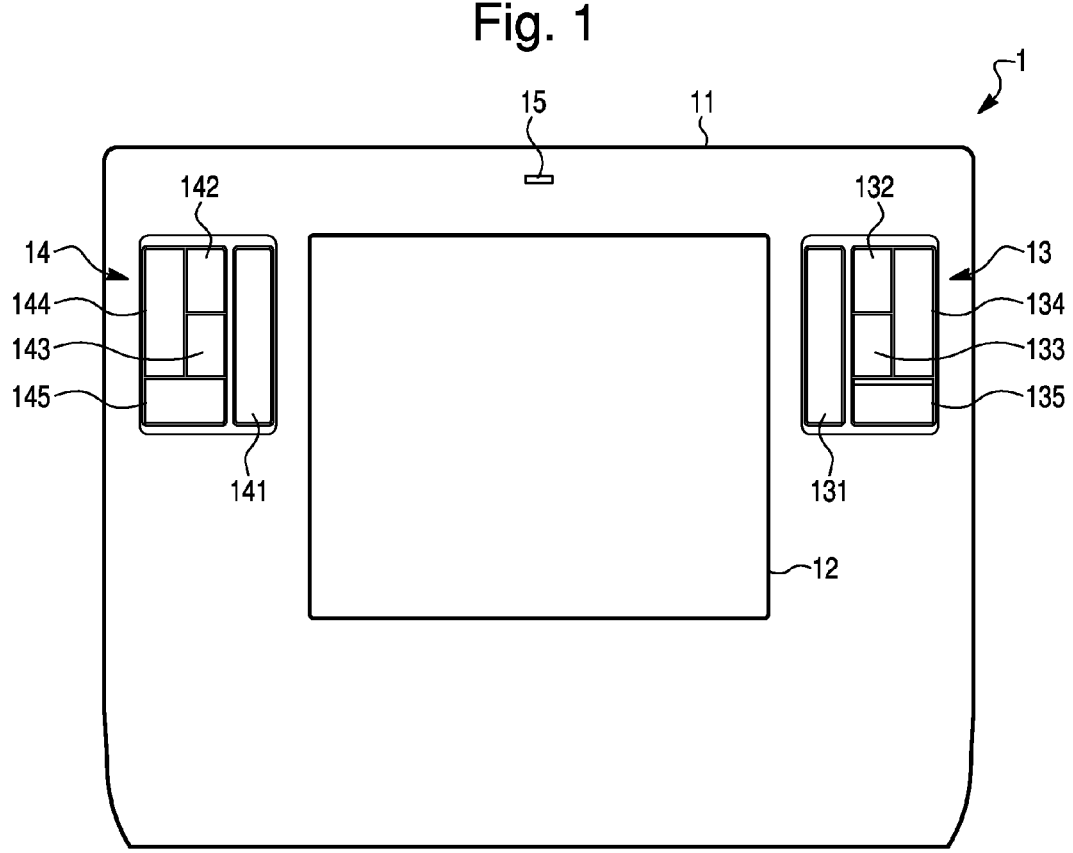
FIG. 1 is a plan view illustrating the overall structure of a tablet according to a first embodiment of the present invention.

A first embodiment according to the present invention will now be described with reference to the drawings. FIG. 1 is a plan view illustrating the overall structure of a tablet 1 serving as a typical position-detecting device according to the first embodiment of the present invention. The tablet 1 is used in combination with an input stylus 21 serving as a typical position-pointing stylus, and is connected to an external electronic device, such as a personal computer, as shown in FIG. 3.

The tablet 1 includes a housing 11 including an operation panel 12, touch pad units 13 and 14, and a pilot lamp 15.

Figure 3:
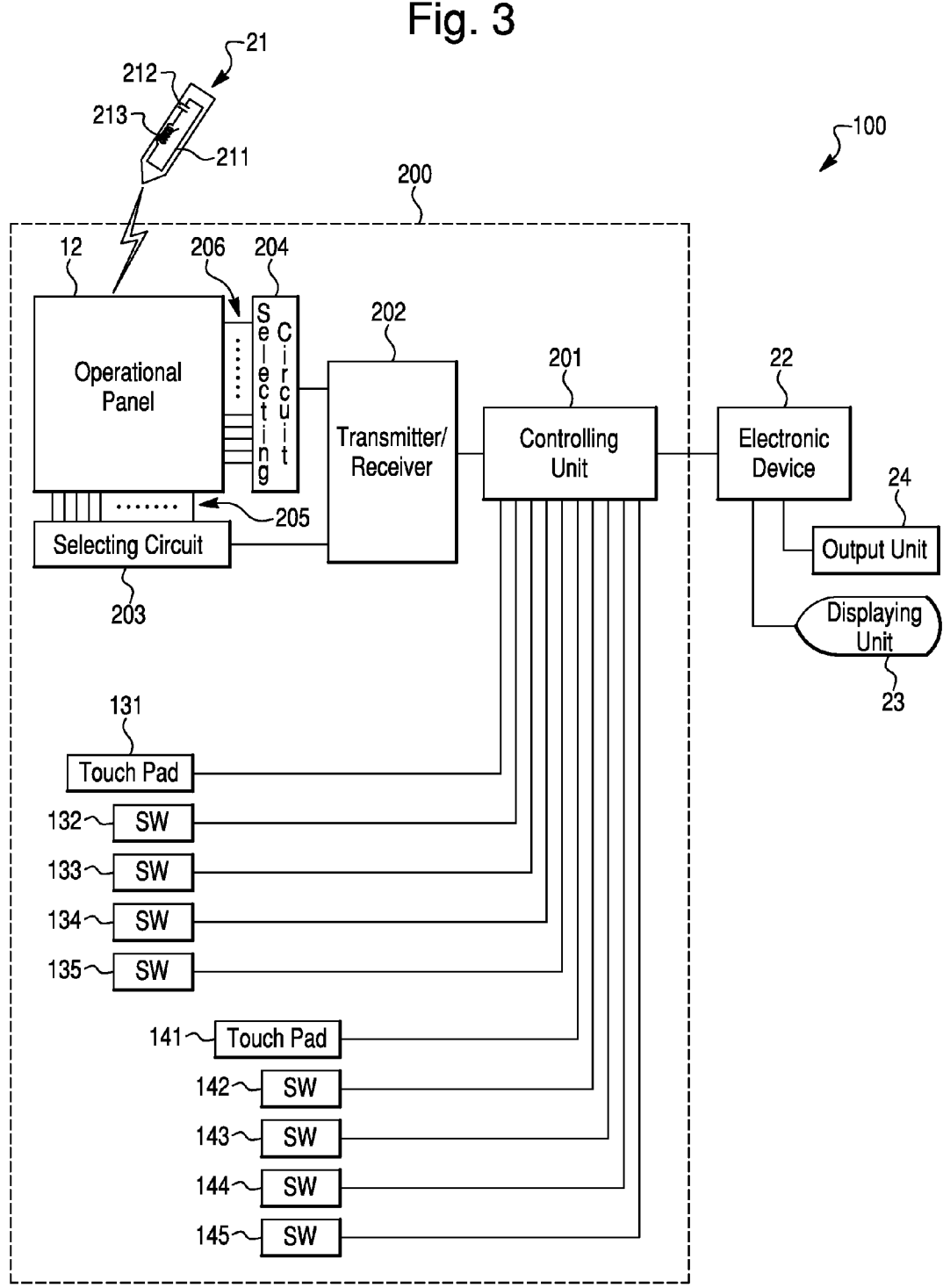
FIG. 3 is a block diagram illustrating the structure of a controlling circuit included in the tablet shown in FIG. 1.

The housing 11 has an approximately rectangular shape, is composed of, for example, a synthetic resin or a metallic material, and includes, for example, a controlling circuit 200, as shown in FIG. 3.

The operation panel 12 is a planar area provided at the approximate midsection of the housing 11. The tablet 1 detects a position on the operation panel 12 pointed to by the input stylus 21. The operation panel 12 includes an XY coordinate system including a virtual X-axis and Y-axis that orthogonally intersect each other. The tablet 1 outputs XY coordinates of the position pointed to by the input stylus 21. In FIG. 1, the X-axis extends in the horizontal direction, and the Y-axis extends in the vertical direction.

The pilot lamp 15 is turned on when the tablet 1 is connected to an electronic device 22 shown in FIG. 3 and becomes available, or detects a manipulation with, for example, the input stylus 21.

The touch pad units 13 and 14 are provided at both sides of the operation panel 12. The touch pad unit 13 includes a touch pad 131 that detects a pushing operation by a user and four switches 132, 133, 134, and 135. The touch pad 131 has a strip shape and detects the position pushed during the pushing operation. The switches 132, 133, 134, and 135 have a strip shape and are turned on by the pushing operation. The switches 132, 133, 134, and 135 may have any shape, such as a circular or quadrate shape, instead of the strip shape.

Figure 2:
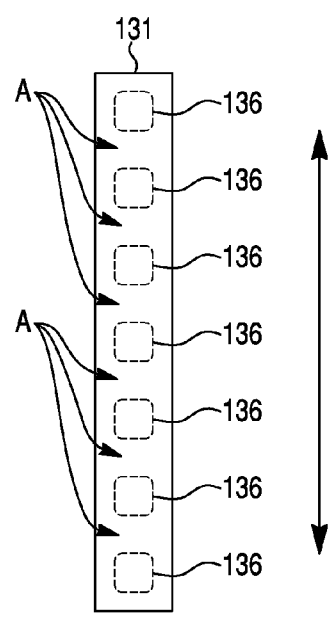
FIG. 2 is a fragmentary enlarged plan view illustrating the detailed structure of the touch pad shown in FIG. 1.

FIG. 2 is a fragmentary enlarged plan view illustrating the detailed structure of the touch pad 131. The touch pad 131 includes a plurality of push-detecting switches 136 in the longitudinal direction. The push-detecting switches 136 are turned on by the pushing operation. The longitudinal direction of the touch pad 131 is referred to as the "axis" indicated by an arrow in the drawing. In this embodiment, the axis of the touch pad 131 is parallel to the Y-axis of the operation panel 12.

The tablet 1 detects a pushed position in the axis direction by determining which of the push-detecting switches 136 are turned on. The tablet 1 may determine that a position between two adjacent push-detecting switches 136 is pushed upon simultaneously detecting the pushing operation on the two push-detecting switches 136. In this arrangement, when the touch pad 131 includes seven push-detecting switches 136, as best shown in FIG. 2, the tablet 1 detects the pushing operation on thirteen positions, i.e., seven positions at the push-detecting switches 136 and six positions between the push-detecting switches 136 indicated by symbols A in the drawing.

Since the touch pad 141 has the same structure as the touch pad 131, the description and drawing of the touch pad 141 are omitted.

FIG. 3 is a block diagram illustrating the structure of the controlling circuit 200 included in the tablet 1. The controlling circuit 200 includes a controlling unit 201, a transmitter/receiver 202, selecting circuits 203 and 204, and loop coils 205 and 206. The touch pads 131 and 141 and the switches 132, 133, 134, 135, 142, 143, 144, and 145 are connected to the controlling unit 201.

FIG. 3 also illustrates the external electronic device 22, which is connected to the tablet 1 and includes a displaying unit 23 and an output unit 24, and the input stylus 21, which is used in combination with the tablet 1. The tablet 1, the input stylus 21, and the electronic device 22 constitute an input system 100.

A plurality of the loop coils 205 are provided under the operation panel 12 and at a predetermined pitch in the X-axis direction of the operation panel 12. Each loop coil 205 extends parallel to the Y-axis of the operation panel 12. Similarly, a plurality of the loop coils 206 are provided under the operation panel 12 and at a predetermined pitch in the Y-axis direction of the operation panel 12. Each loop coil 206 extends parallel to the X-axis of the operation panel 12.

The transmitter/receiver 202 is connected to the controlling unit 201. The loop coils 205 and 206 are connected to the transmitter/receiver 202 through the selecting circuits 203 and 204, respectively. The selecting circuit 203 can select one of the loop coils 205, and the selecting circuit 204 can select one of the loop coils 206.

As described below, the controlling unit 201 selects the loop coils 205 through the selecting circuit 203, and performs transmitting and receiving operations through the transmitter/receiver 202 to retrieve the location in the X-axis direction (the X coordinate) of a position pointed to by the input stylus 21. Similarly, the controlling unit 201 selects the loop coils 206 through the selecting circuit 204, and performs transmitting and receiving operations through the transmitter/receiver 202 to retrieve the location in the Y-axis direction (the Y coordinate) of the position pointed to by the input stylus 21.

Parts of the loop coils 205 and 206 extend beyond and under the operation panel 12 for the following reasons: The tablet 1 can accurately detect a pointed position on the operation panel 12 when there is some dimensional tolerance in the structure; and this arrangement increases flexibility in design.

Thus, in the tablet 1, areas that detect the position of the input stylus 21 include the operation panel 12 and peripheral areas of the operation panel 12. These areas are referred to as detectable areas.

Figure 4:
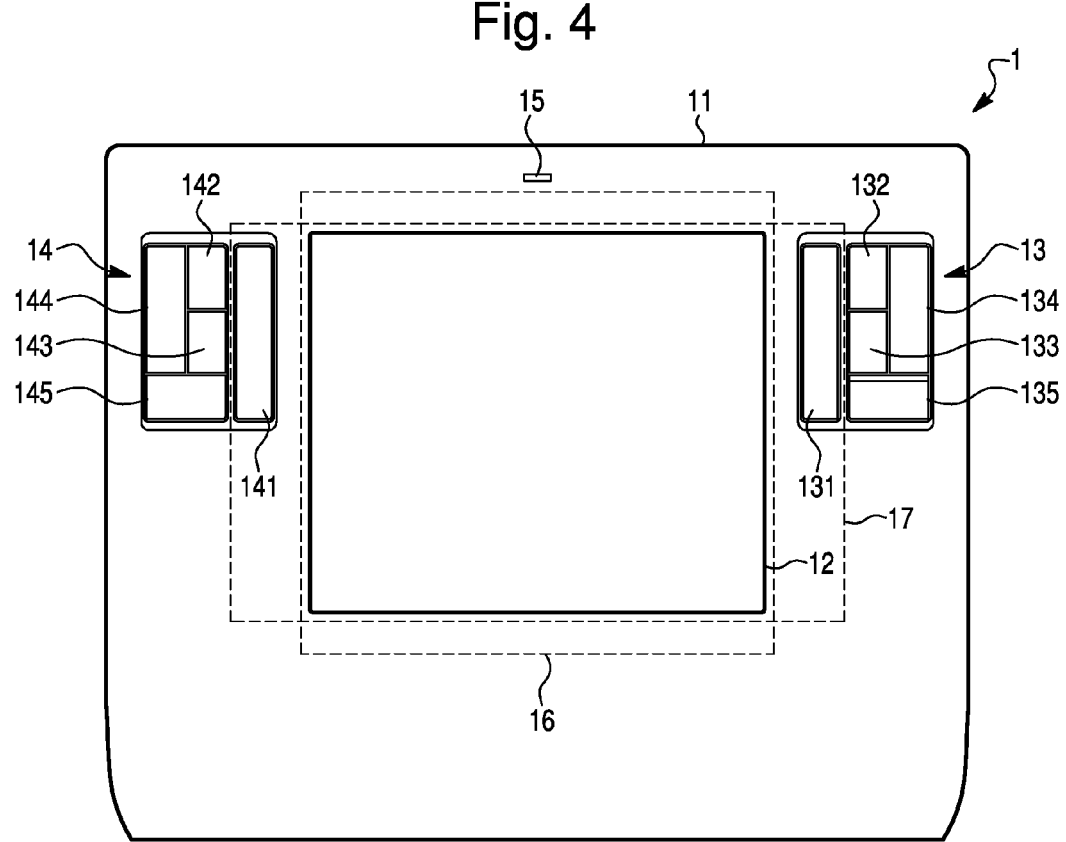
FIG. 4 is a plan view illustrating the layout of detectable areas in the tablet shown in FIG. 1.

FIG. 4 illustrates the layout of the detectable areas in the tablet 1. Specifically, an area directly on the loop coils 205 (indicated by dotted lines in the drawing) is referred to as a detectable area 16, and an area directly on the loop coils 206 (indicated by dotted lines in the drawing) is referred to as a detectable area 17.

The tablet 1 can retrieve the X coordinate of a position on the detectable area 16 pointed to by the input stylus 21. Similarly, the tablet 1 can retrieve the Y coordinate of a position on the detectable area 17 pointed to by the input stylus 21. The tablet 1 can retrieve both the X and Y coordinates of a position on the operation panel 12 pointed to by the input stylus 21.

In FIG. 3, the controlling unit 201 is connected to the electronic device 22 external to the controlling circuit 200. The electronic device 22 is, for example, a personal computer or a personal digital assistant (PDA), and includes, for example, the displaying unit 23 and the output unit 24. The displaying unit 23 includes a screen, such as a cathode ray tube (CRT) or a liquid crystal display (LCD) or other electronic display. The output unit 24 is, for example, a printer.

The electronic device 22 can execute various types of application programs upon receiving signals from the controlling circuit 200. For example, the electronic device 22 performs scrolling and zooming in and out operations on a screen of the displaying unit 23, or performs copy, and cut and paste operations.

As described above, the tablet 1 including the controlling circuit 200 is used in combination with the input stylus 21. The input stylus 21 is a position-pointing stylus including a pen-shaped housing having a resonant circuit 211.

The resonant circuit 211, as best shown in FIG. 3, includes a capacitor 212 and a coil 213. In the resonant circuit 211, an induced current is generated from electromagnetic waves having a predetermined frequency sent from the tablet 1, and then the resonant circuit 211 sends electromagnetic waves having a predetermined frequency to the tablet 1, based on the induced current. The coil 213 is connected to a writing-pressure-detecting unit (not shown) included in the input stylus 21. Inductance in the coil 213 changes in response to the pressure applied to the tip of the input stylus 21, and the resonant frequency of the resonant circuit 211 changes.

The controlling unit 201 controls the transmitter/receiver 202 so as to retrieve coordinates of the position pointed to by the input stylus 21 and output these coordinates to the electronic device 22.

Under the control of the controlling unit 201, the transmitter/receiver 202 selects one of the loop coils 205 through the selecting circuit 203. Then, the transmitter/receiver 202 controls the selected loop coil 205 so as to send the input stylus 21 electromagnetic waves having a predetermined frequency that generate an induced current in the resonant circuit 211, and receives electromagnetic waves generated from this induced current from the input stylus 21. In this way, the transmitter/receiver 202 sequentially selects the loop coils 205 through the selecting circuit 203 and repeats the operation described above to detect the position of the input stylus 21 in the X axis direction.

Similarly, under the control of the controlling unit 201, the transmitter/receiver 202 selects one of the loop coils 206 through the selecting circuit 204. Then, the transmitter/receiver 202 controls the selected loop coil 206 so as to send the input stylus 21 electromagnetic waves having a predetermined frequency that generate an induced current in the resonant circuit 211, and receives electromagnetic waves generated from this induced current from the input stylus 21. In this way, the transmitter/receiver 202 sequentially selects the loop coils 206 through the selecting circuit 204 and repeats the operation described above to detect the position of the input stylus 21 in the Y axis direction.

After the operation described above, the controlling unit 201 outputs XY coordinates of the positions detected by the transmitter/receiver 202 to the electronic device 22. The controlling unit 201 also analyzes the electromagnetic waves from the input stylus 21 through the transmitter/receiver 202 to detect a change in a resonant frequency in the resonant circuit 211 and to detect a pushing operation by the input stylus 21.

When the touch pads 131 and 141 are manipulated, the controlling unit 201 retrieves the manipulation positions based on signals from the touch pads 131 and 141, and determines whether the manipulation is performed by the input stylus 21 or another instrument other than the input stylus 21, for example, the user's finger. Then, the controlling unit 201 generates signals corresponding to the determination result and the manipulation positions, and outputs these signals to the electronic device 22.

When the switches 132, 133, 134, 135, 142, 143, 144, 145 are turned on upon detecting a pushing operation, the controlling unit 201 generates signals representing the switches subjected to the pushing operation based on signals from these switches, and outputs the generated signals to the electronic device 22.

The tablet 1 and the electronic device 22 constitute the input system 100. The tablet 1 may be also used as an input device for the electronic device 22.

A typical operation of the tablet 1 serving as the input device for the electronic device 22 will now be described with reference to FIG. 5.

Figure 5:
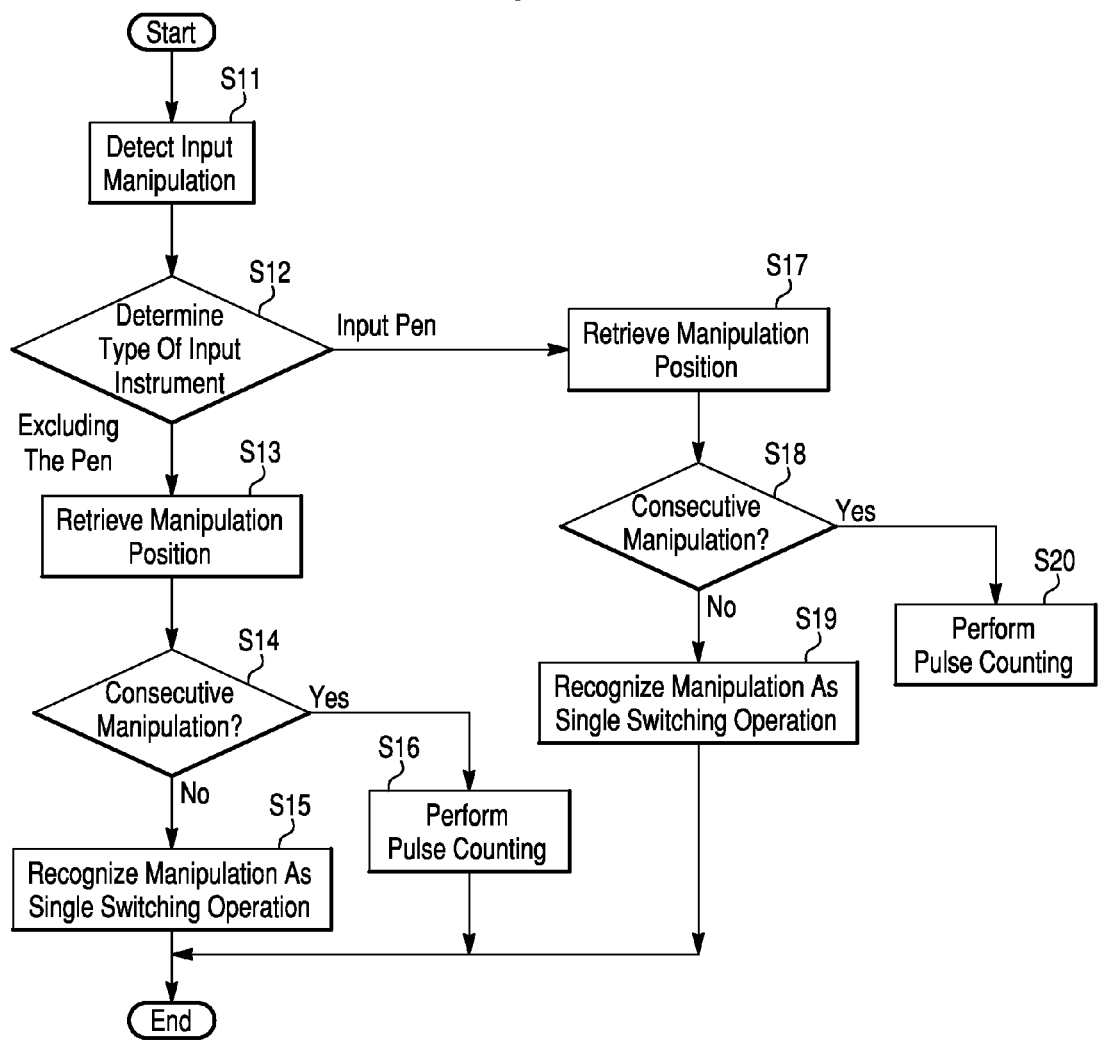
FIG. 5 is a flowchart illustrating a typical operation of the tablet shown in FIG. 1 when the tablet is used as an input device for an electronic device.

The operation illustrated in FIG. 5 may be implemented by either the function of the controlling unit 201 or a program executable in the electronic device 22 connected to the tablet 1, for example, a device driver program. In this case, the operation is implemented by the function of the controlling unit 201.

In FIG. 5, an operation that is performed upon detecting a manipulation on the touch pads 131 and 141 is illustrated.

In step S11, the controlling unit 201 detects a manipulation on either the touch pad unit 13 or 14, based on signals from the touch pad 131 or 141. Then, in step S12, the controlling unit 201 determines whether the manipulation is performed by the input stylus 21 or an instrument other than the input stylus 21 by comparing the manipulation position on the touch pad 131 or 141 and a position of the input stylus 21 detected by the loop coils 205 and 206. For example, upon detecting the manipulation on the touch pad 131 or 141, the controlling unit 201 determines that the touch pad 131 or 141 is manipulated by the input stylus 21 when the position of the input stylus 21 detected by the loop coils 205 and 206 is located outside the operation panel 12 and a pushing operation is performed on the input stylus 21.

Then, the process proceeds to step S13 where the controlling unit 201 retrieves the manipulation position on the touch pad 131 or 141. Then, in step S14, the controlling unit 201 determines whether the manipulation is consecutive. Specifically, the controlling unit 201 determines that the manipulation is consecutive when the elapsed time from the last manipulation to the current manipulation in the touch pad 131 or 141, which detects the manipulation for this time, is within a predetermined time.

When the manipulation is not consecutive, the process proceeds to step S15 where the controlling unit 201 recognizes the manipulation detected in step S11 as a single switching operation and generates a signal corresponding to this manipulation to be output to the electronic device 22.

When the manipulation is consecutive, the process proceeds to step S16 where the controlling unit 201 performs pulse counting. Specifically, the controlling unit 201 counts the number of consecutive manipulations and temporarily holds the positions for every consecutive manipulation when the manipulations are consecutive. Then, the controlling unit 201 generates signals representing a count value and the positions for every consecutive manipulation to be output to the electronic device 22.

Any operations in the electronic device 22 triggered by the signals output from the tablet 1 in the operation shown in FIG. 5 can be predetermined. For example, manipulations on the switches 132, 133, 134, 135, 142, 143, 144, and 145 may trigger various types of operations on a menu screen of an application program, and manipulations on the touch pads 131 and 141 may trigger scrolling and zooming in and out of a screen of the displaying unit 23. According to the present invention, the operations in the electronic device 22 triggered by manipulating components of the touch pad units 13 and 14 are not limited, and the user can assign any operations to the components of the touch pad units 13 and 14.

As described above, the tablet 1 according to the first embodiment of the present invention includes the touch pad units 13 and 14 that can be manipulated by the input stylus 21 or another instrument in addition to the operation panel 12 manipulated by the input stylus 21. Thus, the user can simultaneously perform an operation using the input stylus 21 and another operation on the touch pad units 13 and 14 using the other instrument.

For example, the user can perform an operation using the input stylus 21 in the right hand and another operation on the touch pad unit 14 using the left hand. The user can also manipulate the touch pad units 13 and 14 using the input stylus 21 in the right hand.

In a typical case, when a drawing application program is executed in the electronic device 22, the user can simultaneously draw lines using the input stylus 21 and can manipulate the touch pad units 13 and 14 to invoke a menu screen and perform operations on the menu screen and other operations, such as scrolling the screen and zooming in and out. Thus, the user can perform operations other than an application operation so that the application operation flow using the input stylus 21 and the user's thoughts are not interrupted. Unlike known tablets, the tablet 1 according to the first embodiment can provide the user with excellent operability.

Moreover, when the user manipulates the touch pad units 13 and 14, it can be determined whether the user manipulation is performed by the input stylus 21 or the other instrument. For example, a manipulation on the components of the touch pad units 13 and 14 by the input stylus 21 is distinguished from a manipulation by the other instrument, i.e., the user's finger, so that different functions and operations in the electronic device 22 can be assigned to these types of manipulations. In this arrangement, the user can execute many more functions than the number of the touch pads and switches in the touch pad units 13 and 14. That is, various types of operations can be performed with the touch pad units 13 and 14, and the tablet 1 is thus a flexible input device.

Moreover, since the touch pad units 13 and 14 are provided at both sides of the operation panel 12, the user can use both hands to efficiently perform an input operation. For example, a right-handed user holds the input stylus 21 in the right hand and manipulates the touch pad unit 14 using the left hand. Similarly, a left-handed user holds the input stylus 21 in the left hand and manipulates the touch pad unit 13 using the right hand. Thus, the user can enjoy excellent operability in the input operation.

Moreover, since the switches 132, 133, 134, 135, 142, 143, 144, and 145 have a simple structure, operating errors are less likely to occur even when the user performs the input operation by the nondominant hand, thereby achieving excellent operability. When predetermined operations in the electronic device 22 are assigned to the switches 132, 133, 134, 135, 142, 143, 144, and 145, various types of operations can be performed only with the touch pad units 13 and 14.

Moreover, the touch pads 131 and 141 use the plurality of push-detecting switches 136 shown in FIG. 2. Thus, the touch pads 131 and 141 can reliably detect the user manipulation with a low-cost mechanism.

In the first embodiment, each of the touch pads 131 and 141 includes the plurality of push-detecting switches 136. The present invention is not limited to this embodiment, however, and a capacitive touch pad may be used. The capacitive touch pad can detect a touching manipulation in addition to a pushing manipulation. A touch pad including push-detecting switches that detect minute pressure can also detect a touching manipulation including a pushing operation by minute pressure. Moreover, the touch pad units 13 and 14 may be located at any positions, for example, at the lower edge of the operation panel 12.

Moreover, although the touch pad units 13 and 14 have one axis in the first embodiment, the touch pad units 13 and 14 may have two or more axes to detect a manipulation position in a two-dimensional mode. Other embodiments according to the present invention including such touch pad units will now be described with reference to FIGS. 6 and 7.

In FIGS. 6 and 7, components identical to those in the tablet 1 shown in FIGS. 1 to 5 are shown by the same symbols, and the description of these components is omitted.

FIG. 6 is a plan view illustrating the overall structure of a tablet 3 including touch pads 33 and 34, instead of the touch pad units 13 and 14.

The tablet 3 includes touch pads 33 and 34 at both sides of operation panel 12. The touch pads 33 and 34 are located outside the operation panel 12 and inside a detectable area 17.

The touch pads 33 and 34 have a strip shape and are wider than the touch pad 131 shown in FIG. 2. The touch pads 33 and 34 can detect a manipulation position in a two-dimensional mode during a pushing manipulation. That is, the touch pads 33 and 34 can detect the location of the manipulation position in the horizontal direction and the location of the manipulation position in the vertical direction.

This arrangement can be implemented by providing the push-detecting switches 136 shown in FIG. 2 in a matrix in the touch pads 33 and 34, or by using, for example, a pressure-sensing film for the touch pads 33 and 34.

With the tablet 3, the user can simultaneously manipulate the input stylus 21 and the touch pads 33 and 34, as in the tablet 1 described above. Thus, the same advantages as in the tablet 1 can be achieved.

Moreover, since the touch pads 33 and 34 can detect a manipulation position in a two-dimensional mode, the user can perform various types of input operations by a simple manipulation. For example, in a case where a manipulation in which the user's finger or the input stylus 21 moves on the touch pads 33 and 34 in a predetermined direction triggers a predetermined operation in the electronic device 22, when the user moves his or her finger or the input stylus 21 in the vertical direction, the electronic device 22 controls the displaying unit 23 so as to scroll a screen. When the user moves his or her finger or the input stylus 21 in the horizontal direction, the electronic device 22 controls the displaying unit 23 so as to zoom in and out on the screen. Thus, the tablet 3 is an input device achieving excellent operability.

FIG. 7 is a plan view illustrating the overall structure of a tablet 4 including touch pads 43 and 44 instead of the touch pad units 13 and 14.

The touch pads 43 and 44 preferably have the same structure as the touch pads 33 and 34 shown in FIG. 6 and can detect a manipulation position in a two-dimensional mode during a pushing manipulation. The tablet 4 includes the touch pads 43 and 44 at both ends of an operation panel 12.

In the tablet 4, the user can simultaneously manipulate the input stylus 21 and the touch pads 43 and 44, as in the tablets 1 and 3 described above. Thus, the same advantages as in the tablets 1 and 3 can be achieved.

Moreover, since the touch pads 43 and 44 are disposed within the operation panel 12, the overall size of the tablet 4 can be reduced. That is, since the tablet 4 does not use the detectable areas 16 and 17, unlike the tablets 1 and 3, the overall size of a housing 11 should be the sum of the size of the operation panel 12 and dimensional tolerance.

The tablet 4 can determine whether a pushing manipulation detected by the touch pad 43 or 44 is performed by the input stylus 21 or another instrument. Thus, the tablet 4 may be designed so as to ignore a manipulation by the input stylus 21 but accept a manipulation only by instruments other than the input stylus 21. In this arrangement, even when the input stylus 21 erroneously touches the touch pads 43 and 44 during a manipulation on the operation panel 12 by the input stylus 21, the manipulation is not interrupted. Only when the touch pads 43 and 44 are manipulated by the instruments other than the input stylus 21, for example, the user's finger, operations other than that performed on the operation panel 12 by the input stylus 21 can be performed. This achieves both a reduction in the size and excellent operability in the tablet 4.

In the embodiments described above, details of structures (such as the shapes) of the housing 11, the touch pad units 13 and 14, and the touch pads 33, 34, 43, and 44 can be changed if required. Moreover, there is no special limitation on locations of these components, and these components may be located at the interior and/or the exterior of the operation panel 12, as described above.

The above description illustrates only embodiments according to the present invention, and it should not be construed that the description limits the technical field to which the present invention is applicable.

What I claimed is:

1. An electronic device for drawing a picture, comprising:
   an operation panel configured to receive electromagnetic waves from a resonant circuit in an electronic position-pointing instrument having a pen-shaped housing manipulated on the operation panel by a user performing a drawing operation, the drawing operation comprising drawing a picture;
   a touch pad located at an interior and/or exterior of the operation panel and configured to detect a user's finger for performing a setting operation; and
   a control unit configured to detect the drawing operation performed by a first manipulation of location pointed to by the position-pointing instrument, the control unit further configured to detect the setting operation performed by a second manipulation by the user's finger using the touch pad and to distinguish the setting operation from the first manipulation of location pointed to by the position-pointing instrument, wherein the second manipulation using the touch pad is detectable to invoke the setting operation while the drawing operation using the position-pointing instrument is performed,
   wherein the control unit is configured to permit simultaneous implementation of the drawing operation and the setting operation,
   wherein the setting operation comprises at least zooming in and/or out.

2. The electronic device according to claim 1, wherein the setting operation further comprises at least one of selecting colors, controlling line thickness, and scrolling.

3. The electronic device according to claim 1, wherein the touch pad comprises a capacitive touch pad.

4. The electronic device according to claim 1, wherein the touch sensor area is located wholly outside the operation panel.

5. The electronic device according to claim 1, wherein the touch sensor area is located wholly within the operation panel.

6. The electronic device according to claim 1, wherein the position-detecting device is a tablet.

* * * * *